Figure 1:
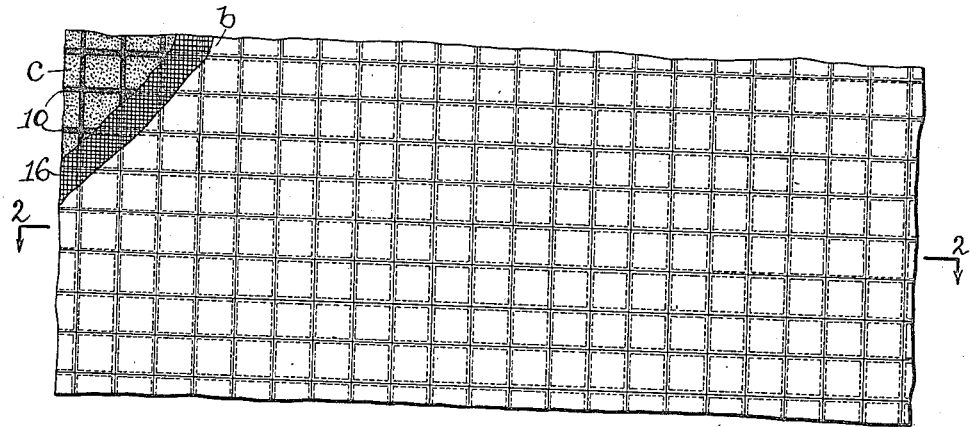

F. O. SMALL.
FLEXIBLE COMPOSITE SHEET AND METHOD OF MAKING THE SAME.
APPLICATION FILED MAR. 17, 1916.

1,209,506.

Patented Dec. 19, 1916.

Inventor
Frank O. Small

By Jas. H. Churchill
Attorney

UNITED STATES PATENT OFFICE.

FRANK O. SMALL, OF BOSTON, MASSACHUSETTS.

FLEXIBLE COMPOSITE SHEET AND METHOD OF MAKING THE SAME.

1,209,506.      Specification of Letters Patent.      Patented Dec. 19, 1916.

Application filed March 17, 1916. Serial No. 84,959.

*To all whom it may concern:*

Be it known that I, FRANK O. SMALL, a citizen of the United States, and a resident of Boston, in the county of Suffolk and State of Massachusetts, have invented an Improvement in Flexible Composite Sheets and Methods of Making the Same, of which the following description, in connection with the accompanying drawings, is a specification, like characters on the drawings representing like parts.

This invention relates to a composite sheet, which is normally flexible and capable of being shaped as desired and which is capable of being converted into a rigid body by means of heat and cold so as to enable the sheet to permanently retain the form into which it may be shaped.

The invention further relates to a novel process for making the composite sheet.

The composite normally flexible sheet is adapted among other uses to be employed for box toes, counters, stays and other parts of a boot or shoe as will be described.

The composite sheet in its preferred form comprises essentially outside sheets or layers of flexible material, such as cloth, paper and the like, and an intermediate layer of material normally in a condition which permits flexure of the outside sheets and capable of being converted into a substantially rigid body by means of heat and cold. A gum or resin, such as shellac, mastic, copal, etc., is a suitable material for the purpose. The gum or resin in powdered form is laid or spread on one of the fibrous layers and the other fibrous layer is then laid upon the powdered gum or resin. The outside sheets or layers are then secured together so as to leave the whole or the greater portion of the intermediate layer in its normal powdered condition, yet have the same confined between the outside sheets or layers so as to keep the intermediate layer in substantially its normal position with relation to said outside layers, yet enable the flexible composite sheet to be handled. This may be done by securing the fibrous sheets together by rows of stitches or by heating portions of the intermediate layer so as to soften or fuse the same and form what may be termed cells, whose walls cement the fibrous sheets together and leave the powdered material in the cells in its normally loose condition, which permits the composite sheet to be handled as one piece and to be shaped into any desired form, as, for instance, that of a box toe, counter or stay for boots and shoes. After the flexible composite sheet has been shaped into the form desired, it is subjected to heat to soften or fuse the powdered material and cause the same to coalesce and convert the same into a continuous layer, which hardens when cooled and forms a rigid or substantially rigid body or layer, and as a result the composite sheet which is normally flexible is converted into an article, which is substantially non-flexible and permanent.

These and other features of this invention will be pointed out in the claims at the end of this specification.

Figure 2:
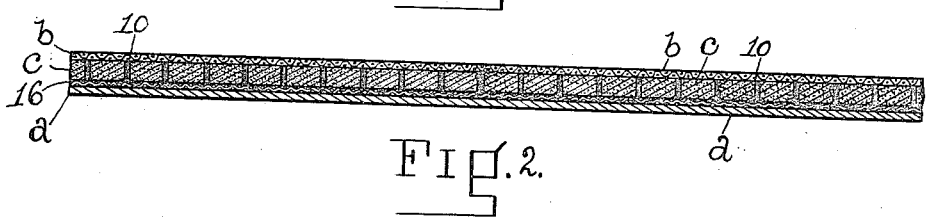
Figure 3:
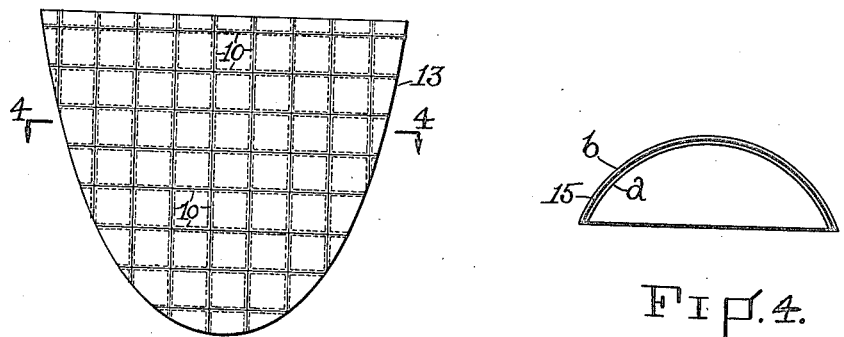
Figure 4:
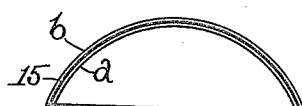

Figure 1 is a plan view with parts broken away of a sufficient portion of a composite sheet embodying this invention. Fig. 2, a section on an enlarged scale on the line 2—2, Fig. 1. Fig. 3, a plan of a composite sheet in the form of a box toe blank. Fig. 4, a section of the box toe formed from the blank shown in Fig. 3, the section being taken on the line 4—4, Fig. 3, and Fig. 5, an enlarged section of a portion of the box toe shown in Fig. 4.

Referring to the drawings and especially to Fig. 2, *a* represents a layer of paper, cloth or other flexible fibrous material, which forms one outside layer of the flexible composite sheet preferred by me, and *b* represents a layer of cloth or other fibrous material, which forms the second outside layer of the composite sheet. Between the layers *a*, *b* is interposed a layer *c* of material capable of being converted into a substantially rigid body by heat and cold, such as shellac, mastic, copal or other gum, resin, etc., but which for sake of simplicity will be hereinafter referred to as shellac. The shellac layer *c* in powdered form is laid upon one of the outside layers, as for instance, the paper layer *a*, and the layer of powder may be of any desired depth within limits. The sheets *a*, *b*, are now secured together in such manner as will retain the layer *c* of powdered material in its normal condition, so that the sheet may be handled and shaped into any form desired without displacement of the powdered layer *c*, and this result may be effected by subdividing the powdered layer *c* into cells 10, in which the powdered material is confined against substantial movement or displacement when the sheet is handled. The cells referred to may and preferably will be made by heating portions of the powdered material so as to soften or fuse the same, and in the present instance, the fused portions which constitute the walls of the cells are represented by solid black lines in Figs. 1 and 2 and by dotted lines in Figs. 1 and 3.

In the present instance, the cells 10 are shown as rectangular in form but they may be circular or of other shape.

The fused walls of the cells 10 serve to cement the layers *a*, *b* together and also to form the cells, which are of substantially small area for the best results, and confine the powdered material *c* in the same. The composite sheet thus formed is capable of being bent or shaped into any form desired, or blanks for articles may be cut from said sheet.

Figure 5:
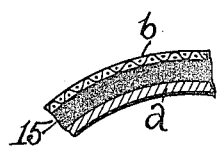

In Fig. 3, I have represented a flat blank 13, which is of proper shape to be bent into the form of a box toe for boots and shoes, and which is stitched or otherwise secured to the upper of the boot or shoe in the process of manufacturing the latter. After the flexible sheet or blank 13 has been incorporated in the boot or shoe, it is subjected to heat while the shoe is on the last, by applying a heated iron or tool to the toe portion of the upper. The heat thus applied fuses or softens the powdered material in the cells 10 and causes it to coalesce and unite with the walls of the latter so as to form a one piece layer, as represented in Figs. 4 and 5, by the heavy black line 15. After the heat is removed, the intermediate fused layer 15 solidifies and becomes hard and rigid or substantially so, and a rigid or substantially rigid sheet is formed, and a permanent form is imparted to the box toe which holds the toe portion of the shoe in the shape desired against ordinary usage.

If desired, the flexible composite sheet may be provided with additional layers of fibrous material, as, for instance, substantially wide mesh fabric, such as gauze, and in Figs. 1 and 2, I have shown a single gauze layer 16, which serves to reinforce the composite sheet and also to assist in holding the powdered material against movement on the paper layer *a*.

It may be preferred to form the cells 10 by fusing portions of the powdered material, but it is not desired to limit the invention in this respect, as the cells may be formed by rows of stitches which have the same relations to one another as the wall of the cells 10.

The composite sheet herein shown is especially useful in the manufacture of box toes for boots and shoes, as it enables the box toe blank to be manipulated like any flexible piece of material during the process of manufacturing the shoe, and when the shoe is completed and while on the last or other form, it is capable of being converted from a flexible box toe into a substantially stiff or rigid box toe. Other parts of the boot or shoe, such as counters, stays, etc., and also other articles may be made from the flexible composite sheet, and it is not desired to restrict the invention in this respect.

When a gum like shellac is used, it is preferred to use paper as one outside layer of the composite sheet, so as to avoid the shellac penetrating through the layer onto the last or other form and sticking thereto.

By the term "shellac" as employed in the claims, I deside to include gums or resins or other materials having the property of coalescing by heat and of becoming hard when cooled.

Claims:

1. A flexible composite sheet comprising layers of fibrous material, an interposed layer of material in a loosely divided non-adhesive state, which is capable of being converted into a substantially rigid layer by heat and cold, and means for securing said fibrous layers together and said interposed layer in practically fixed position with relation to said fibrous layers, while the greater portion of the interposed layer remains in its non-adhesive condition.

2. A flexible composite sheet comprising layers of fibrous material, and an interposed layer of material in a loosely divided state which is capable of being converted into a substantially rigid layer by heat and cold, and means for sub-dividing said loosely divided material between said fibrous layers.

3. A flexible composite sheet comprising layers of fibrous material, and an interposed layer of shellac in a loosely divided non-adhesive state, and means for securing said fibrous layers together to form cells between them in which the loose shellac is confined.

4. A flexible composite sheet comprising layers of fibrous material, and an interposed layer of shellac having portions cemented to said fibrous layers to secure them together and to form cells in which other portions of said shellac layer are confined in a loosely divided state.

5. A flexible composite article comprising layers of non-metallic material, and an interposed layer of material in a loosely divided state and capable of coalescing under heat, said layers of non-metallic material having portions cemented together by portions of said interposed layer while other portions of the latter are in their loosely divided state.

6. The method of making a composite sheet of the character described, which consists in interposing between layers of fibrous material a layer of material in powdered non-adhesive form and capable of coalescing under heat, and subjecting the composite sheet thus formed to the action of heat to cause the layer of powdered material to coalesce and adhere to said fibrous layers and to form a continuous layer which is substantially rigid when cold.

7. The method of making a composite sheet of the character described, which consists in interposing between layers of fibrous material a layer of material in powdered form and capable of coalescing under heat, sub-dividing the said powdered layer to form cells, and subjecting the sheet to the action of heat and cold.

8. The method of making a composite sheet of the character described, which consists in interposing between layers of fibrous material a layer of material in powdered form and capable of coalescing under heat, subjecting the portions of said powdered layer to heat to cement together portions of said fibrous layers and form cells, and thereafter subjecting the entire powdered layer to heat to coalesce the same and form a substantially rigid layer.

9. The method of making a composite sheet of the character described, which consists in applying to a flexible layer of fibrous material a layer of material in a loosely divided non-adhesive state and capable of being converted into a substantially non-flexible layer by heat and cold, and subjecting said layers to heat and cold to cause the powdered material to coalesce and adhere to the layer of fibrous material and to form a substantially hard continuous layer when cold.

In testimony whereof, I have signed my name to this specification.

FRANK O. SMALL.